(12) United States Patent
Lagler

(10) Patent No.: US 12,355,500 B2
(45) Date of Patent: Jul. 8, 2025

(54) MEASUREMENT APPLICATION DEVICE, AND METHOD

(71) Applicant: Rohde & Schwarz GmbH & Co. KG, Munich (DE)

(72) Inventor: Andreas Lagler, Rosenheim (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 72 days.

(21) Appl. No.: 18/497,478

(22) Filed: Oct. 30, 2023

(65) Prior Publication Data

US 2025/0141569 A1 May 1, 2025

(51) Int. Cl.
*H04B 17/17* (2015.01)
*H04B 17/29* (2015.01)

(52) U.S. Cl.
CPC ............ *H04B 17/17* (2015.01); *H04B 17/29* (2015.01)

(58) Field of Classification Search
CPC ........ G01R 23/12; G01R 29/18; G01R 29/26; G01R 31/28; G01R 31/317; H04B 10/63; H04B 17/10; H04B 17/15; H04B 17/17; H04B 17/29; H04B 17/345; H04L 1/24; H04L 25/00; H04L 29/08
USPC ............ 324/76.19, 76.52, 86, 612; 370/252; 375/219, 224, 226, 260, 267, 316, 346, 375/376
See application file for complete search history.

(56) References Cited

U.S. PATENT DOCUMENTS

| | | | | |
|---|---|---|---|---|
| 9,485,598 | B2* | 11/2016 | Roth | G01R 29/26 |
| 10,756,829 | B1* | 8/2020 | Therrien | H04B 17/17 |
| 10,841,019 | B1 | 11/2020 | Shah et al. | |
| 2013/0221946 | A1* | 8/2013 | Eckert | G01R 29/26 324/86 |

* cited by examiner

*Primary Examiner* — Shawkat M Ali
(74) *Attorney, Agent, or Firm* — BROOKS KUSHMAN P.C.

(57) ABSTRACT

The present disclosure provides a measurement application device comprising a first measurement signal path configured to receive an analog measurement signal, and to convert the analog measurement signal into a first digital measurement signal, a first signal processor configured to convert the first digital measurement signal into a first IQ data stream, a first demodulator configured to perform an IQ demodulation on the first IQ data stream and provide a first complex signal data stream, a first selector configured to group samples of the first complex signal data stream according to predetermined criteria, and to output at least one respective first group of samples of the first complex signal data stream, and a respective second signal processing path, wherein a cross-correlator calculates a cross-correlation for the samples of each group pair comprising one of the first groups, and the respective second group. Further, a respective method is provided.

22 Claims, 7 Drawing Sheets

MEASUREMENT APPLICATION DEVICE, AND METHOD

TECHNICAL FIELD

The disclosure relates to a measurement application device, and a respective method.

BACKGROUND

Although applicable to any type of measurement application device, the present disclosure will mainly be described in conjunction with spectrum analyzers.

In common spectrum analyzers, scalar values obtained by cross-correlation of an input signal measured via two different ports may be output as measurement results. Such scalar output signals separate the correlated noise amount caused by the device under test from the uncorrelated noise amount caused by the two measurement ports. However, outputting a scalar value limits the available amount of information.

Accordingly, there is a need for improving signal measurements.

SUMMARY

The above stated problem is solved by the features of the independent claims. It is understood, that independent claims of a claim category may be formed in analogy to the dependent claims of another claim category.

Accordingly, it is provided:

A measurement application device comprising a first measurement signal path configured to receive an analog measurement signal, wherein the first measurement signal path is configured to convert the analog measurement signal into a first digital measurement signal, a first signal processor coupled to the first measurement signal path, wherein the first measurement signal path is configured to convert the first digital measurement signal into a first IQ data stream, a first demodulator coupled to the first signal processor, wherein the first demodulator is configured to perform an IQ demodulation on the first IQ data stream and provide a first complex signal data stream, and a first selector coupled to the first demodulator, wherein the first selector is configured to group samples of the first complex signal data stream according to predetermined criteria, and to output at least one respective first group of samples of the first complex signal data stream. The measurement application device further comprises a second measurement signal path configured to receive the same analog measurement signal that is received by the first measurement signal path, wherein the second measurement signal path is configured to convert the analog measurement signal into a second digital measurement signal, a second signal processor coupled to the second measurement signal path, wherein the second signal processor is configured to convert the second digital measurement signal into a second IQ data stream, a second demodulator coupled to the second signal processor, wherein the second demodulator is configured to perform an IQ demodulation on the second IQ data stream and provide a second complex signal data stream, and a second selector coupled to the second demodulator, wherein the second selector is configured to group samples of the second complex signal data stream according to the same predetermined criteria as the first selector, and to output at least one respective second group of samples of the second complex signal data stream. The measurement application device further comprises a cross-correlator coupled to the first selector, and the second selector, wherein the cross-correlator is configured to calculate a cross-correlation for the samples of each group pair comprising one of the first groups, and the respective second group.

Further, it is provided:

A signal processing method, especially a computer implemented signal processing method, the method comprising receiving an analog measurement signal, converting the analog measurement signal into a first digital measurement signal, converting the first digital measurement signal into a first IQ data stream, performing an IQ demodulation on the first IQ data stream and providing a respective first complex signal data stream, grouping samples of the first complex signal data stream according to predetermined criteria, outputting at least one respective first group of samples of the first complex signal data stream. The method further comprises converting the analog measurement signal into a second digital measurement signal, converting the second digital measurement signal into a second IQ data stream, performing an IQ demodulation on the second IQ data stream and providing a respective second complex signal data stream, grouping samples of the second complex signal data stream according to the same predetermined criteria as the first selector, outputting at least one respective second group of samples of the second complex signal data stream, and calculating a cross-correlation for the samples of each group pair comprising one of the first groups, and the respective second group.

The present disclosure is based on the finding that traditional spectrum analyzers only provide a scalar value for a measurement value, like an error vector magnitude.

The present disclosure further is based on the finding that providing additional information to such a scalar value will support a user in performing a respective measurement task.

The present disclosure therefore provides the measurement application device, and method that may provide such additional information to the user.

To this end, the measurement application device comprises two dedicated measurement signal paths that both acquire the same analog measurement signal. The two measurement signal paths may each be coupled to a dedicated measurement port of the measurement application device, wherein both measurement ports may be coupled to the same device under test, also called DUT, to acquire the same or identical analog measurement signal.

Each one of the measurement signal paths converts the received analog measurement signal into a respective digital measurement signal, and provides the generated digital measurement signal to a respective signal processor. The signal processors each convert the respective digital measurement signal into a respective IQ data stream. Each IQ data stream is provided to a respective demodulator that performs an IQ demodulation of the respective IQ data stream, and provides a respective complex signal data stream. The complex signal data streams are each provided to a respective selector that selects and groups the single samples of the respective complex signal data stream according to predefined criteria.

The expression "group" or "select and group" in this context refers to the selectors categorizing the single samples of the complex signal data streams into respective groups according to the predefined criteria. Such groups may also be called "bins", or "buckets".

In embodiments, the selectors may e.g., group the samples of the complex signal data streams according to the signal power. In such an embodiment, the possible signal power range may be divided into a plurality of ranges, or sections. Such ranges, or sections may comprise equally sized ranges, or sections, or may comprise ranges, or sections of different sizes. In other embodiments, the selectors may e.g., group the samples of the complex signal data streams according to the constellation points the samples refer to.

The above functions may be performed in parallel until the original analog measurement signal is converted into the first group of samples of the first complex signal data stream, and into second groups of samples of the second complex signal data stream.

A cross-correlator is coupled to the first selector, and to the second selector. The cross-correlator calculates a cross-correlation for each pair of a first group and a corresponding second group. The pairs of groups are formed by combining a first group with a second group that comprises samples that meet the same criterion as the samples of the first group.

For example, if the signal power is used to group the samples of the first complex signal data stream, and of the second complex signal data stream, a first group may be combined with the second group that comprises samples within the same signal power range, or section, as the samples of the first group.

In an example that uses constellation points to group the samples of the first complex signal data stream, and of the second complex signal data stream, a first group may be combined with the second group that comprises samples that refer to the same constellation point as the samples of the first group.

By calculating the cross-correlation for each pair of a first group, and a second group, it is now possible to provide additional information to a user. Instead of a pure scalar value, it is for example possible to provide a trace of the value over power, or over constellation points.

In the context of the present disclosure a measurement application device may comprise any device that may be used in a measurement application to acquire an input signal, and to perform additional or supporting functions in a measurement application. A measurement application device may also, at least in part, comprise or be implemented as program application or program applications, also called measurement program application or measurement program applications, that may be executed on a computer device and that may communicate with other measurement application devices in order to perform a measurement task. A measurement application, also called measurement setup, may e.g., comprise at least one or multiple different measurement application devices for performing electric, magnetic, or electromagnetic measurements, especially on single devices under test. Such electric, magnetic, or electromagnetic measurements may e.g., be performed in a measurement laboratory or in a production facility in the respective production line. An exemplary measurement application or measurement setup may serve to qualify the single devices under test i.e., to determine the proper electrical operation of the respective devices under test.

Measurement application devices to this end may comprise at least one signal acquisition section for acquiring electric, magnetic, or electromagnetic signals to be measured from a device under test, or at least one signal generation section for generating electric, magnetic, or electromagnetic signals that may be provided to the device under test. Such a signal acquisition section may comprise, but is not limited to, a front-end for acquiring, filtering, and attenuating or amplifying electrical signals. In embodiments, the signal acquisition is performed via the signal acquisition section in a wired or contact-based manner or fashion. To this end, a respective measurement probe may be coupled to the measurement application device via a respective cable.

Further, when acquiring signals, measurement application devices may comprise a signal processing section that may process the acquired signals. Processing may comprise converting the acquired signals from analog to digital signals, and any other type of digital signal processing, for example, converting signals from the time-domain into the frequency-domain.

The measurement application devices may also comprise a user interface to display the acquired signals to a user and allow a user to control the measurement application devices. Of course, a housing may be provided that comprises the elements of the measurement application device. It is understood, that further elements, like power supply circuitry, and communication interfaces may be provided.

A measurement application device may be a stand-alone device that may be operated without any further element in a measurement application to perform tests on a device under test. Of course, communication capabilities may also be provided for the measurement application device to interact with other measurement application devices.

A measurement application device may comprise, for example, a signal acquisition device e.g., an oscilloscope, especially a digital oscilloscope, a spectrum analyzer, or a vector network analyzer. Such a measurement application device may also comprise a signal generation device e.g., a signal generator, especially an arbitrary signal generator, also called arbitrary waveform generator, or a vector signal generator. Further possible measurement application devices comprise devices like calibration standards, or measurement probe tips.

Of course, at least some of the possible functions, like signal acquisition and signal generation, may be combined in a single measurement application device.

In embodiments, the measurement application device may comprise pure data acquisition devices that are capable of acquiring an input signal and of providing the acquired input signal as digital input signal to a respective data storage or application server. Such pure data acquisition devices not necessarily comprise a user interface or display. Instead, such pure data acquisition devices may be controlled remotely e.g., via a respective data interface, like a network interface or a USB interface.

Further embodiments of the present disclosure are subject of the further dependent claims and of the following description, referring to the drawings.

In the following, the dependent claims referring directly or indirectly to claim 1 are described in more detail. For the avoidance of doubt, the features of the dependent claims relating to the measurement application device can be combined in all variations with each other and the disclosure of the description is not limited to the claim dependencies as specified in the claim set. Further, the features of the other independent claims may be combined with any of the features of the dependent claims relating to the measurement application device in all variations, wherein respective method steps perform the function of the respective apparatus elements.

In an embodiment, which can be combined with all other embodiments of the measurement application device mentioned above or below, the measurement application device may further comprise a measurement port, and a signal splitter. The signal splitter may be coupled to the measurement port, and to the first measurement signal path, and the second measurement signal path. Further, the signal splitter may be configured to receive the analog measurement signal from the input port, and split the analog measurement signal, and provide the split analog measurement signal to the first measurement signal path, and the second measurement signal path.

As explained above, a dedicated measurement port may be provided for each one of the measurement signal paths. However, in embodiments, the two measurement signal paths may both be coupled to the same measurement port of the measurement application device via the signal splitter.

With the signal splitter in the measurement application device, the measurement application setup may be simplified, since only a single port of the measurement application device needs to be coupled to the device under test.

In a further embodiment, which can be combined with all other embodiments of the measurement application device mentioned above or below, the selection criteria may refer to a property of the samples. Further, the first selector may group samples into the same first group if the value of the property of the samples is identical or within a predefined value range. In addition, the second selector may group samples into the same second group if the value of the property of the samples is identical or within a predefined value range.

The property of the samples may be any type of property that may be determined in addition to the actual signal value.

For grouping or categorizing single samples, the selectors may select a group for each sample. The selectors may select the same group for all samples that comprise the property with an identical value or a value within a predetermined value range, or with values of the property that deviate less than a predetermined threshold from each other.

In another embodiment, which can be combined with all other embodiments of the measurement application device mentioned above or below, the property for the samples of the first complex signal data stream may be provided by the first demodulator, and the property for the samples of the second complex signal data stream may be provided by the second demodulator.

The first demodulator, and the second demodulator each operate on the samples of the respective IQ data stream, and, therefore, may determine additional information i.e., the property, or the value of the property, easily.

Therefore, the first, and the second demodulator may not only provide the first, and second IQ data stream to the first, and second selector. Instead, the demodulators may also provide the values of the property for the samples of the first, and the second complex signal data stream.

In a further embodiment, which can be combined with all other embodiments of the measurement application device mentioned above or below, the property of the samples comprises at least one of a signal power, a constellation point, and a time window.

The present disclosure is not limited to the above-presented properties. Any other property that may be useful for grouping the samples may be used.

In another embodiment, which can be combined with all other embodiments of the measurement application device mentioned above or below, the result of the cross-correlation may comprise at least one of an error vector magnitude over signal power, an error vector magnitude over constellation point, and an error vector magnitude over time windows. In this context, the term "time window" refers to partitioning the error vector magnitude values, i.e., the result would be cross-correlated error vector magnitude values vs time at a reduced time resolution.

As already explained above, the result of the cross correlation may be linked to further information. Specific examples comprise the signal power as additional information, the constellation point as additional information, and the time or a time window as additional information, while the present disclosure is not limited to these examples.

In another embodiment, which can be combined with all other embodiments of the measurement application device mentioned above or below, the first selector may be configured to select samples of the first complex signal data stream for a single first group and discard samples that do not form part of the single first group. Further, the second selector may be configured to select samples of the second complex signal data stream for a single second group and discard samples that do not form part of the single second group.

In such an embodiment, the first selector and the second selector may identify samples of the first complex signal data stream, and the second complex signal data stream, respectively, that are within a specific category, and discard all other samples. The first selector, and the second selector, therefore, either include a sample in the result set, or discard the sample completely.

In such embodiments, the first selector, and the second selector perform a kind of binary or black-and-white selection.

In an embodiment, which can be combined with all other embodiments of the measurement application device mentioned above or below, the first selector may be configured to select samples of the first complex signal data stream for at least two first groups. In addition, the second selector may be configured to select samples of the second complex signal data stream for at least two second groups.

In contrast to the above-disclosed embodiment, in this embodiment, the first selector, and the second selector, may categorize the single samples of the first complex signal data stream, and the second complex signal data stream, respectively, into multiple categories or bins.

In such an embodiment, at least two or more than two different groups or categories may be defined, and the first selector, and the second selector may categorize the samples accordingly.

In embodiments, samples that do not fall into any one of the categories may be discarded. In other embodiments, open groups may be defined on the edges of the possible value ranges, and all samples not falling into any of the other groups or categories may be categorized into a respective open group.

For example, multiple different groups may be defined for specific signal power ranges. In embodiments, each group may comprise or represent a specific power range. Any sample having a signal power lower than the group representing the lowest signal power range may be discarded, and any sample having a signal power higher than the group representing the highest signal power range may also be discarded. In other embodiments, at least one of the first group, and the last group i.e., the group representing the lowest signal power, and the group representing the highest signal power, may be an open group.

In another embodiment, which can be combined with all other embodiments of the measurement application device mentioned above or below, the first measurement signal path may comprise a first mixer and a first oscillator for mixing the analog measurement signal with the output signal of the first oscillator. In addition, the second measurement signal path may comprise a second mixer and a second oscillator for mixing the analog measurement signal with the output signal of the second oscillator. Further, the first oscillator, and the second oscillator may be configured to output a signal with the same frequency. In embodiments, the first oscillator, and the second oscillator may also be configured to output signals with a common time base.

The oscillators in the first measurement signal path, and the second measurement signal path may each comprise a dedicated hardware unit, such that their frequencies do not correlate, even though both, the first oscillator, and the second oscillator, output a signal with the same frequency.

The mixers serve to downmix the analog measurement signal from its original radio frequency RF to an intermediate frequency IF for further processing.

In a further embodiment, which can be combined with all other embodiments of the measurement application device mentioned above or below, at least one of the first measurement signal path, and the second measurement signal path may comprise at least one of a filter, an amplifier, and an attenuator.

In embodiments, at least one of the first measurement signal path, and the second measurement signal path may comprise further analog signal processing elements, especially in combination with the above-mentioned mixers.

Such elements may comprise at least one of filters, amplifiers, and attenuators without being limited to these examples.

In another embodiment, which can be combined with all other embodiments of the measurement application device mentioned above or below, at least one of the first signal processor may be configured to at least one of resample the first digital measurement signal, and decimate the first digital measurement signal, or the second signal processor may be configured to at least one of resample the second digital measurement signal, and decimate the second digital measurement signal.

By resampling, the first signal processor may increase the data rate or sampling rate of the first digital measurement signal. Decimating results in a reduced data rate or sampling rate of the first digital measurement signal. The same applies to the second signal processor for the second digital measurement signal mutatis mutandis.

BRIEF DESCRIPTION OF THE DRAWINGS

For a more complete understanding of the present disclosure and advantages thereof, reference is now made to the following description taken in conjunction with the accompanying drawings. The disclosure is explained in more detail below using exemplary embodiments which are specified in the schematic figures of the drawings, in which.

In the figures like reference signs denote like elements unless stated otherwise.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
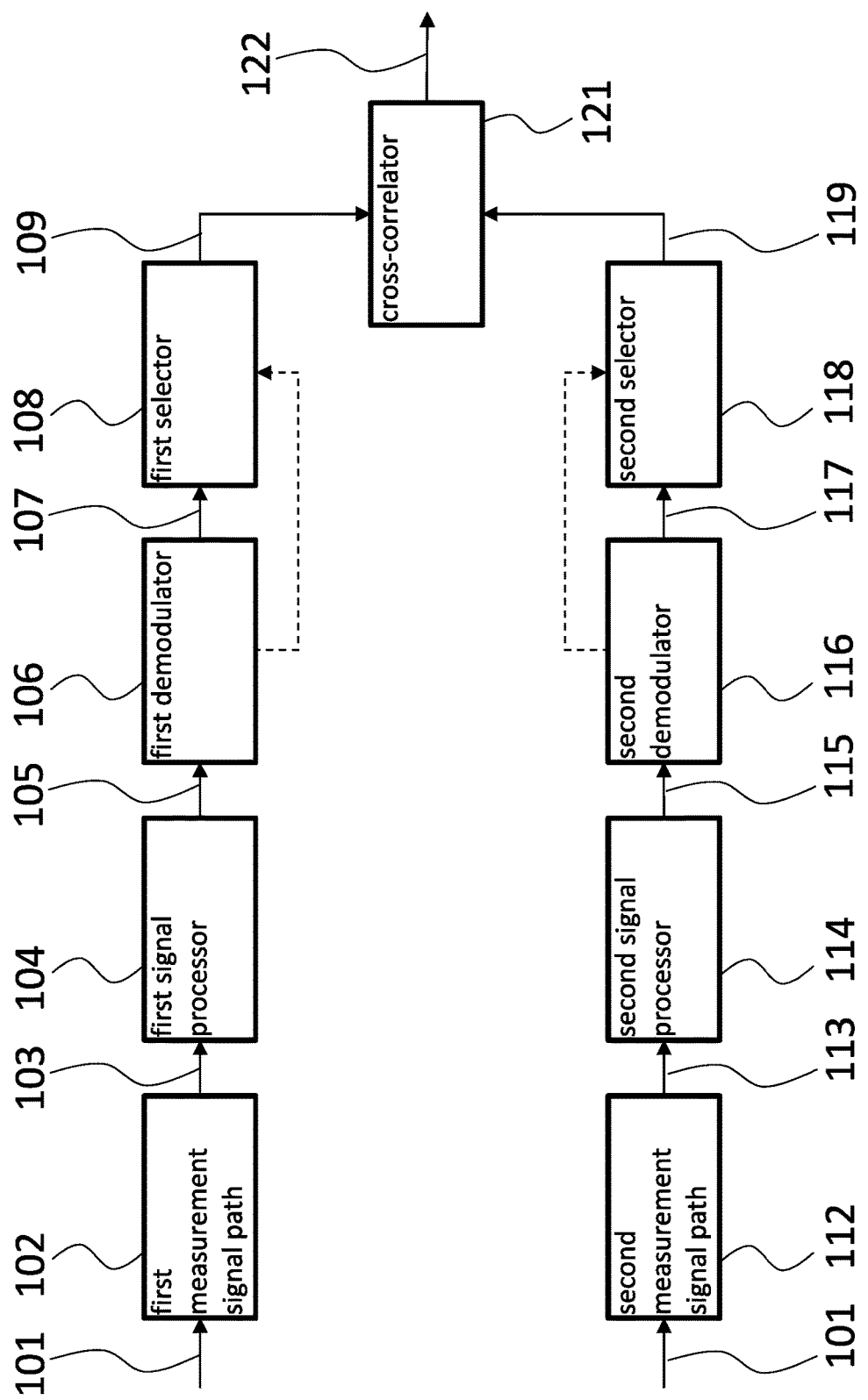
FIG. 1 shows a block diagram of an embodiment of a measurement application device according to the present disclosure.

FIG. 1 shows a block diagram of a measurement application device 100. The measurement application device 100 generally comprises two signal paths with a first measurement signal path 102 that is coupled to a first signal processor 104 that is coupled to a first demodulator 106, that is coupled to a first selector 108, and with a second measurement signal path 112 that is coupled to a second signal processor 114 that is coupled to a second demodulator 116 that is coupled to a second selector 118. The first selector 108, and the second selector 118 are both coupled to a cross-correlator 121. The explanations provided herein for any other embodiment of the measurement application device also apply mutatis mutandis to the measurement application device 100.

During operation, the first measurement signal path 102 receives an analog measurement signal 101, and converts the analog measurement signal 101 into a first digital measurement signal 103. The first digital measurement signal 103 is converted by the first signal processor 104 into a first IQ data stream 105, e.g., of in-phase and quadrature sinusoids. This first IQ data stream 105 is provided to the first demodulator 106 for demodulation, wherein the first demodulator 106 provides a first complex signal data stream 107 to the first selector 108.

The second measurement signal path 112 also receives the analog measurement signal 101, and converts the analog measurement signal 101 into a second digital measurement signal 113. The second digital measurement signal 113 is converted by the second signal processor 114 into a second IQ data stream 115. The second IQ data stream 115 is provided to the second demodulator 116 for demodulation, wherein the second demodulator 116 provides a second complex signal data stream 117 to the second selector 118.

The first selector 108 groups samples of the first complex signal data stream 107 according to predetermined criteria, and outputs at least one respective first group of samples 109 of the first complex signal data stream 107 to the cross-correlator 121. The second selector 118 groups samples of the second complex signal data stream 117 according to the same predetermined criteria as the first selector 108, and outputs at least one respective second group of samples 119 of the second complex signal data stream 117 to the cross-correlator 121.

The cross-correlator 121 calculates a cross-correlation 122 for the samples of each group pair comprising one of the first groups 109, and the respective second group 119.

The selection criteria may refer to a property of the samples of the first complex signal data stream 107, and the second complex signal data stream 117. Such properties may in embodiments be determined by the first demodulator 106, and the second demodulator 116 (indicated by dashed lines). Each one of the first groups 109, and the second groups 119 may comprise samples for which the property has a specific value or is within a specific value range.

The property may e.g., refer to a signal power, a constellation point, and a time window. Consequently, the result of the cross-correlation 122 may comprise at least one of an error vector magnitude over signal power, an error vector magnitude over constellation point, and an error vector magnitude over time windows.

In embodiments, the first signal processor 104 may at least one of resample the first digital measurement signal 103, and decimate the first digital measurement signal 103 prior to providing the first IQ data stream 105 to the first demodulator 106. In addition, the second signal processor 114 may at least one of resample the second digital measurement signal 113, and decimate the second digital measurement signal 113 prior to providing the second IQ data stream 115 to the second demodulator 116.

Although not explicitly shown, the measurement application device 100 may also comprise a display to show the output of the cross-correlator 121 to a user.

Figure 2:
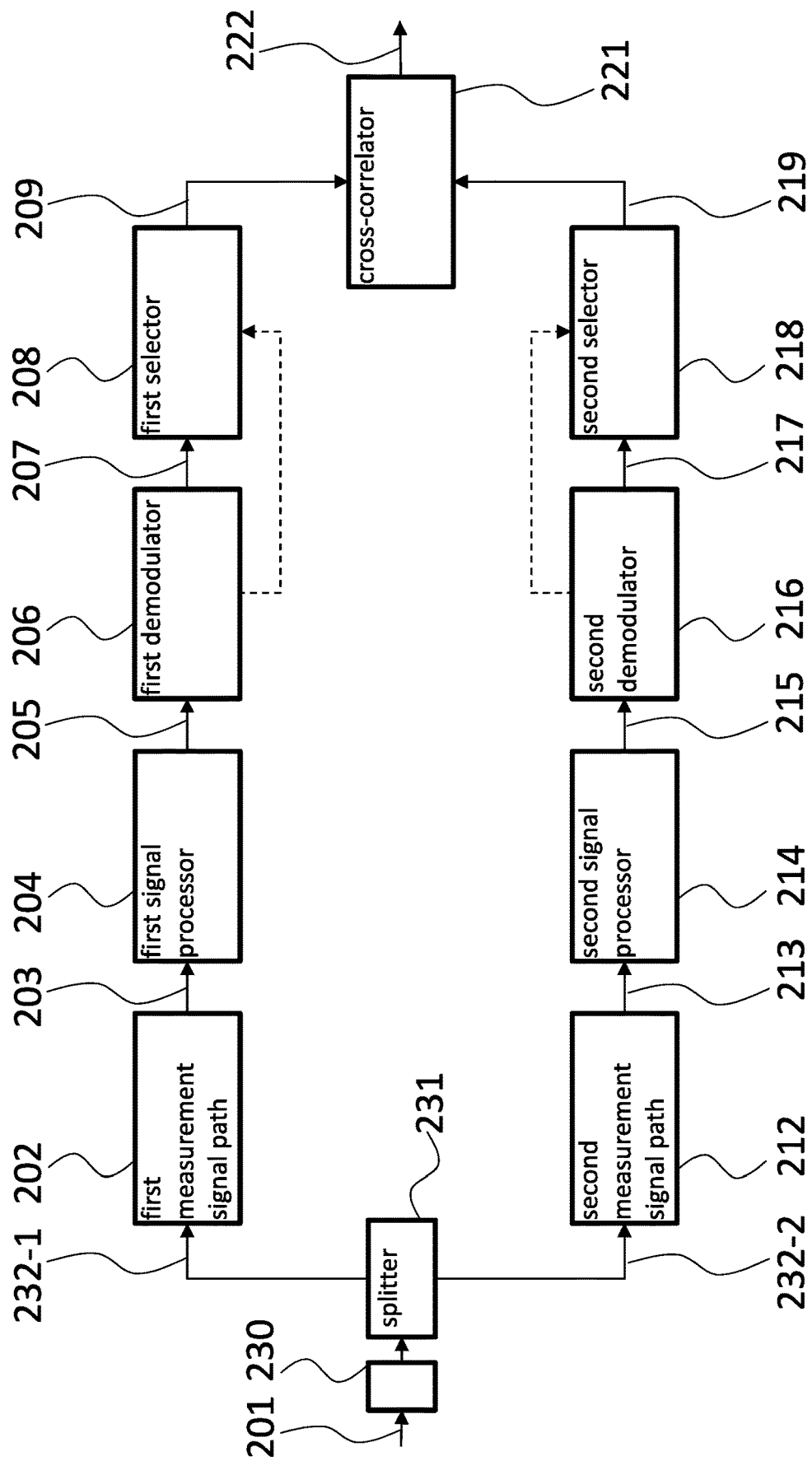
FIG. 2 shows a block diagram of another embodiment of a measurement application device according to the present disclosure.

FIG. 2 shows a block diagram of a measurement application device 200. The measurement application device 200 is based on the measurement application device 100. The measurement application device 200, therefore, comprises two signal paths with a first measurement signal path 202 that is coupled to a first signal processor 204 that is coupled to a first demodulator 206, that is coupled to a first selector 208, and with a second measurement signal path 212 that is coupled to a second signal processor 214 that is coupled to a second demodulator 216 that is coupled to a second selector 218. The first selector 208, and the second selector 218 are both coupled to a cross-correlator 221. The explanations provided herein for any other embodiment of the measurement application device also apply mutatis mutandis to the measurement application device 200.

The measurement application device 200 further comprises a measurement port 230, and a signal splitter 231. The signal splitter 231 is coupled to the measurement port 230, and to the first measurement signal path 202, and the second measurement signal path 212.

The signal splitter 231 receives the analog measurement signal 201 from the input port 230, and splits the analog measurement signal 201, and provides the split analog measurement signal 232-1 to the first measurement signal path 202, and the split analog measurement signal 232-2 to the second measurement signal path 212.

With the signal splitter 231 the analog measurement signal 201 only has to be acquired once and may internally in the measurement application device 200 be distributed to the two different signal paths.

Figure 3:
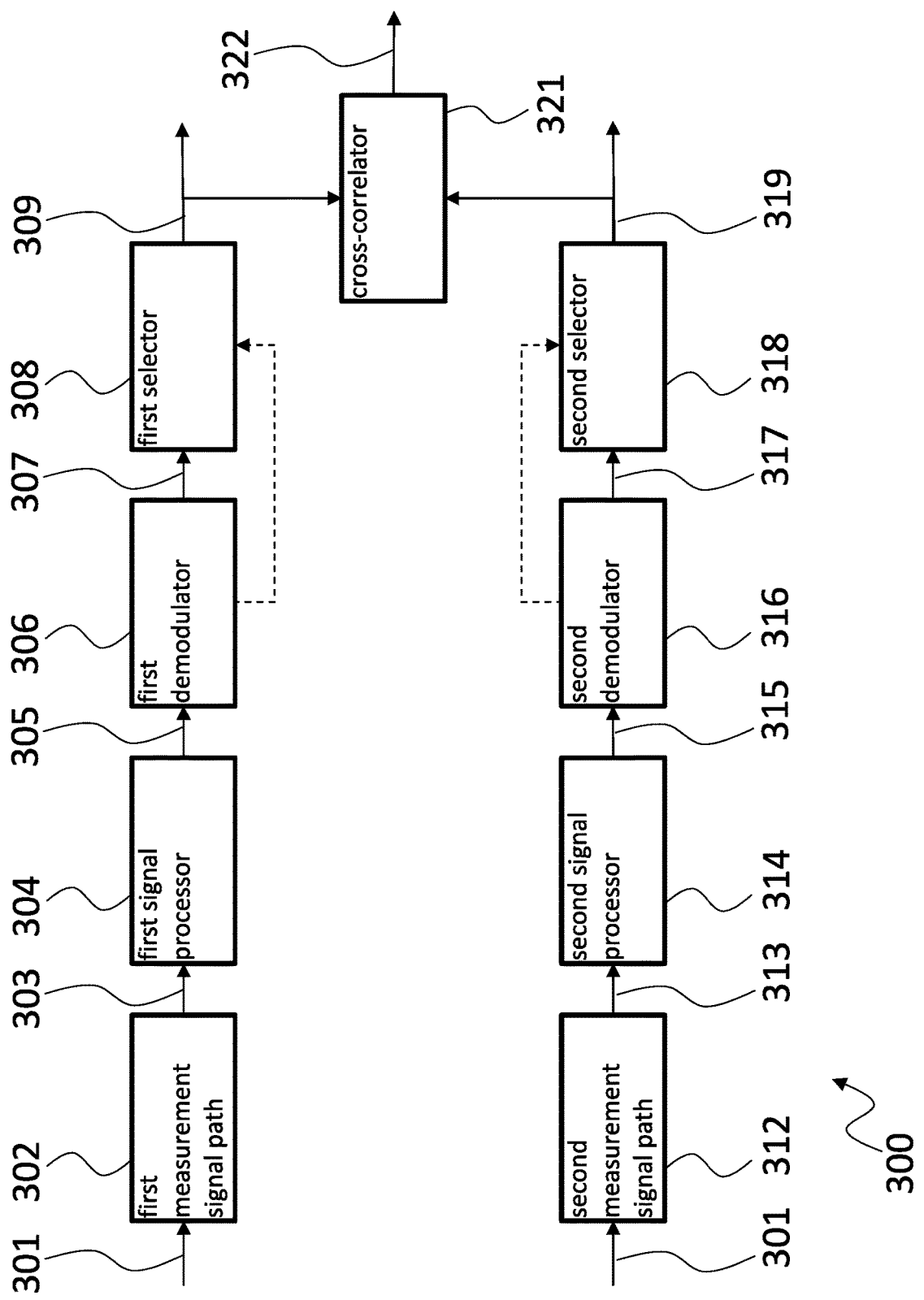
FIG. 3 shows a block diagram of another embodiment of a measurement application device according to the present disclosure.

FIG. 3 shows a block diagram of a measurement application device 300. The measurement application device 300 is based on the measurement application device 100. The measurement application device 300, therefore, comprises two signal paths with a first measurement signal path 302 that is coupled to a first signal processor 304 that is coupled to a first demodulator 306, that is coupled to a first selector 308, and with a second measurement signal path 312 that is coupled to a second signal processor 314 that is coupled to a second demodulator 316 that is coupled to a second selector 318. The first selector 308, and the second selector 318 are both coupled to a cross-correlator 321. The explanations provided herein for any other embodiment of the measurement application device also apply mutatis mutandis to the measurement application device 300.

In the measurement application device 300, the first selector 308 selects samples of the first complex signal data stream 307 for a single first group 309 and discards samples that do not form part of the single first group 309. Discarding the samples that do not form part of the single first group 309 is indicated by an arrow that is not coupled to any other element of the measurement application device 300.

The second selector 318 selects samples of the second complex signal data stream 317 for a single second group 319, and discards samples that do not form part of the single second group 319. Discarding the samples that do not form part of the single second group 319 is indicated by an arrow that is not coupled to any other element of the measurement application device 300.

Figure 4:
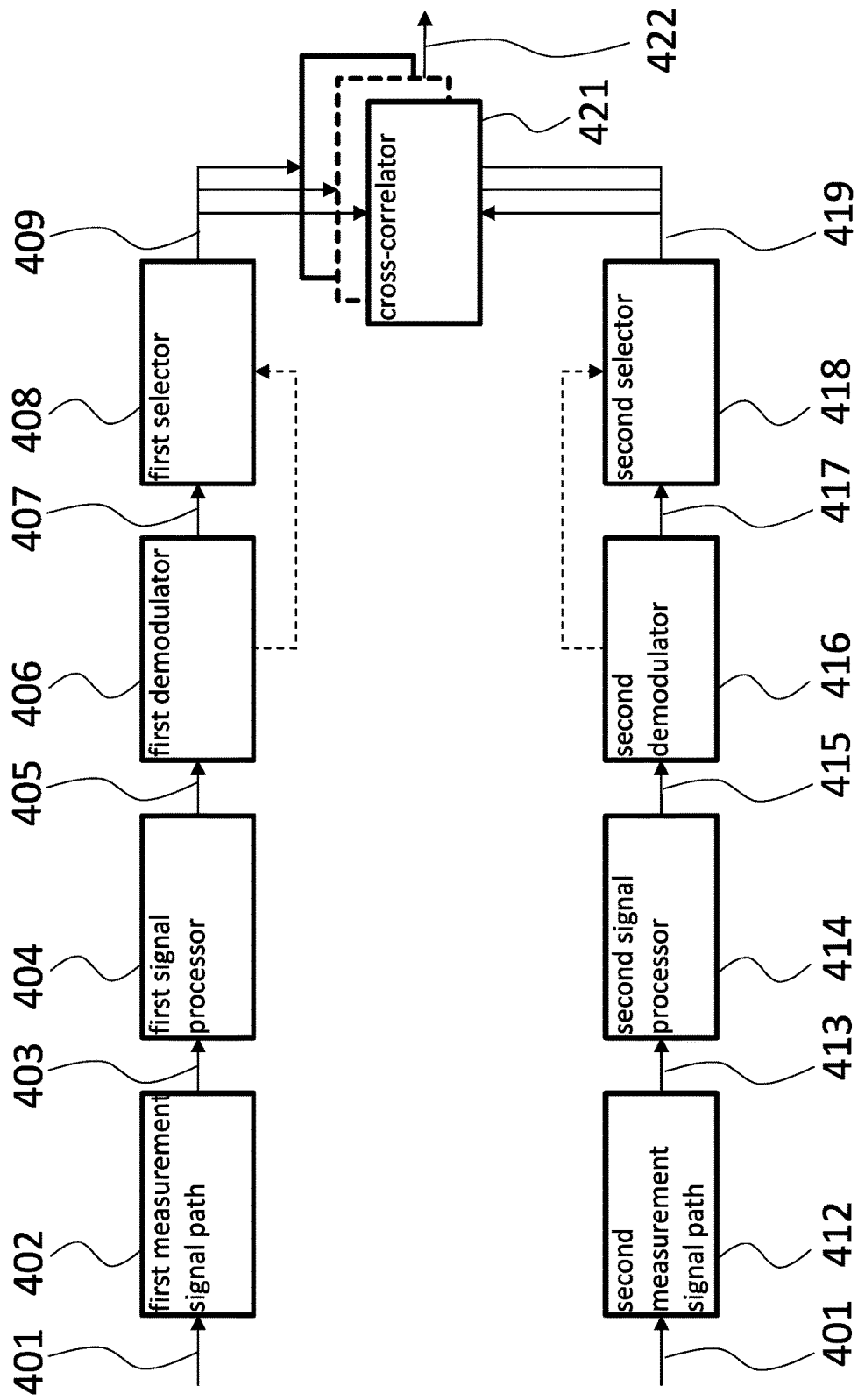
FIG. 4 shows a block diagram of another embodiment of a measurement application device according to the present disclosure.

FIG. 4 shows a block diagram of a measurement application device 400. The measurement application device 400 is based on the measurement application device 100. The measurement application device 400, therefore, comprises two signal paths with a first measurement signal path 402 that is coupled to a first signal processor 404 that is coupled to a first demodulator 406, that is coupled to a first selector 408, and with a second measurement signal path 412 that is coupled to a second signal processor 414 that is coupled to a second demodulator 416 that is coupled to a second selector 418. The first selector 408, and the second selector 418 are both coupled to a cross-correlator 421. The explanations provided herein for any other embodiment of the measurement application device also apply mutatis mutandis to the measurement application device 400.

In the measurement application device 400, the first selector 408 selects samples of the first complex signal data stream 407 for at least two different first groups 409. The second selector 418 selects samples of the second complex signal data stream 417 for at least two different second groups 419.

In the FIG. 4 multiple cross-correlators 421 are shown, wherein each cross-correlator 421 processes one pair of a first group 409, and the respective second group 419. In embodiments, a single cross-correlator 421 with multiple parallel channels may also be used.

Figure 5:
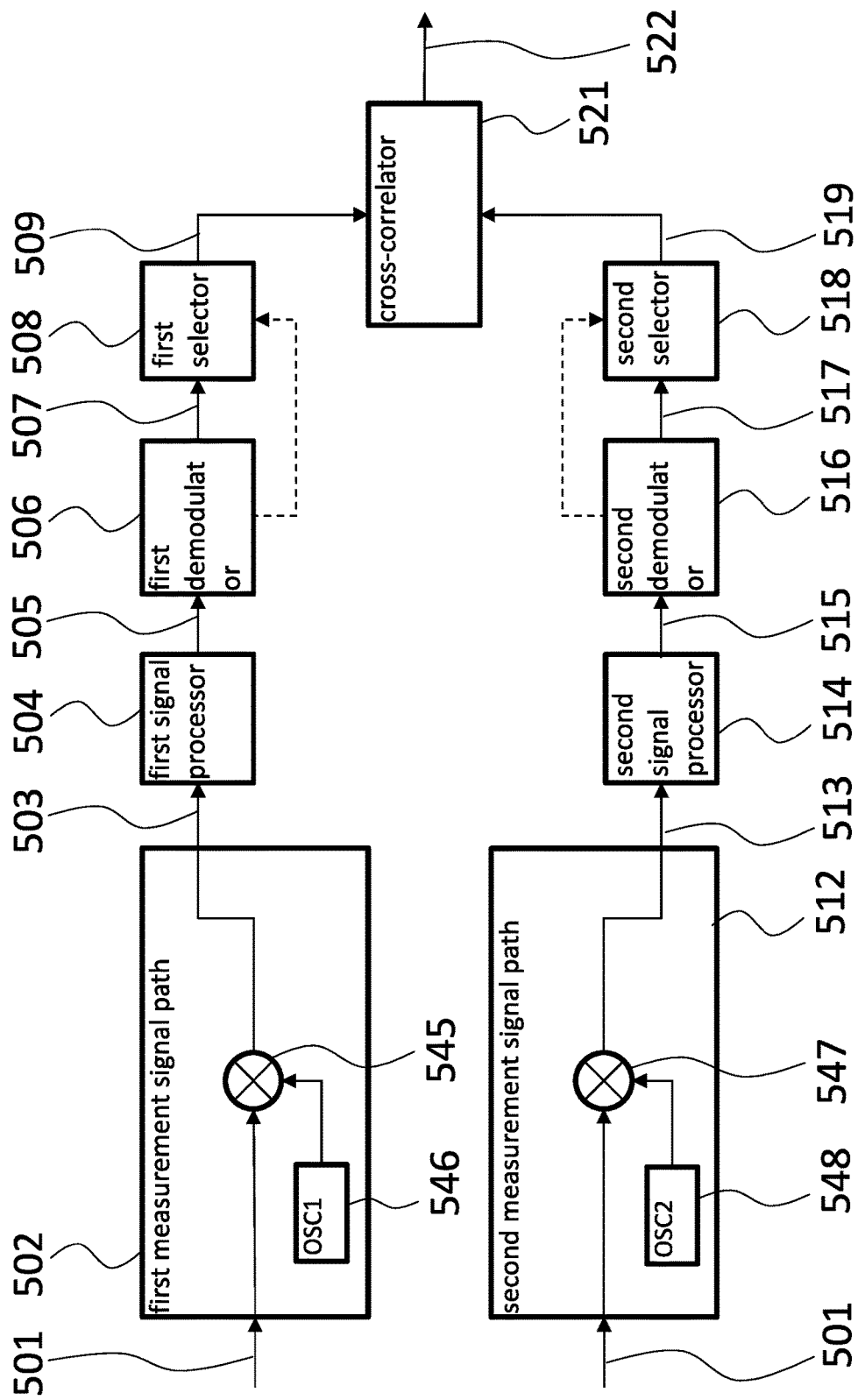
FIG. 5 shows a block diagram of another embodiment of a measurement application device according to the present disclosure.

FIG. 5 shows a block diagram of a measurement application device 500. The measurement application device 500 is based on the measurement application device 100. The measurement application device 500, therefore, comprises two signal paths with a first measurement signal path 502 that is coupled to a first signal processor 504 that is coupled to a first demodulator 506, that is coupled to a first selector 508, and with a second measurement signal path 512 that is coupled to a second signal processor 514 that is coupled to a second demodulator 516 that is coupled to a second selector 518. The first selector 508, and the second selector 518 are both coupled to a cross-correlator 521. The explanations provided herein for any other embodiment of the measurement application device also apply mutatis mutandis to the measurement application device 500.

In the measurement application device 500, the first measurement signal path 502 comprises a first mixer 545, and a first oscillator 546. The first mixer 545 receives the analog measurement signal 501, and the signal from the first oscillator 546 for downmixing the analog measurement signal 501 from an RF frequency to an intermediate frequency.

The second measurement signal path 512 comprises a second mixer 547, and a second oscillator 548. The second mixer 547 receives the analog measurement signal 501, and the signal from the second oscillator 548 for downmixing the analog measurement signal 501 from an RF frequency to an intermediate frequency.

Both, the first oscillator 546, and the second oscillator 548 may provide a signal with the same frequency, and time base.

Figure 6:
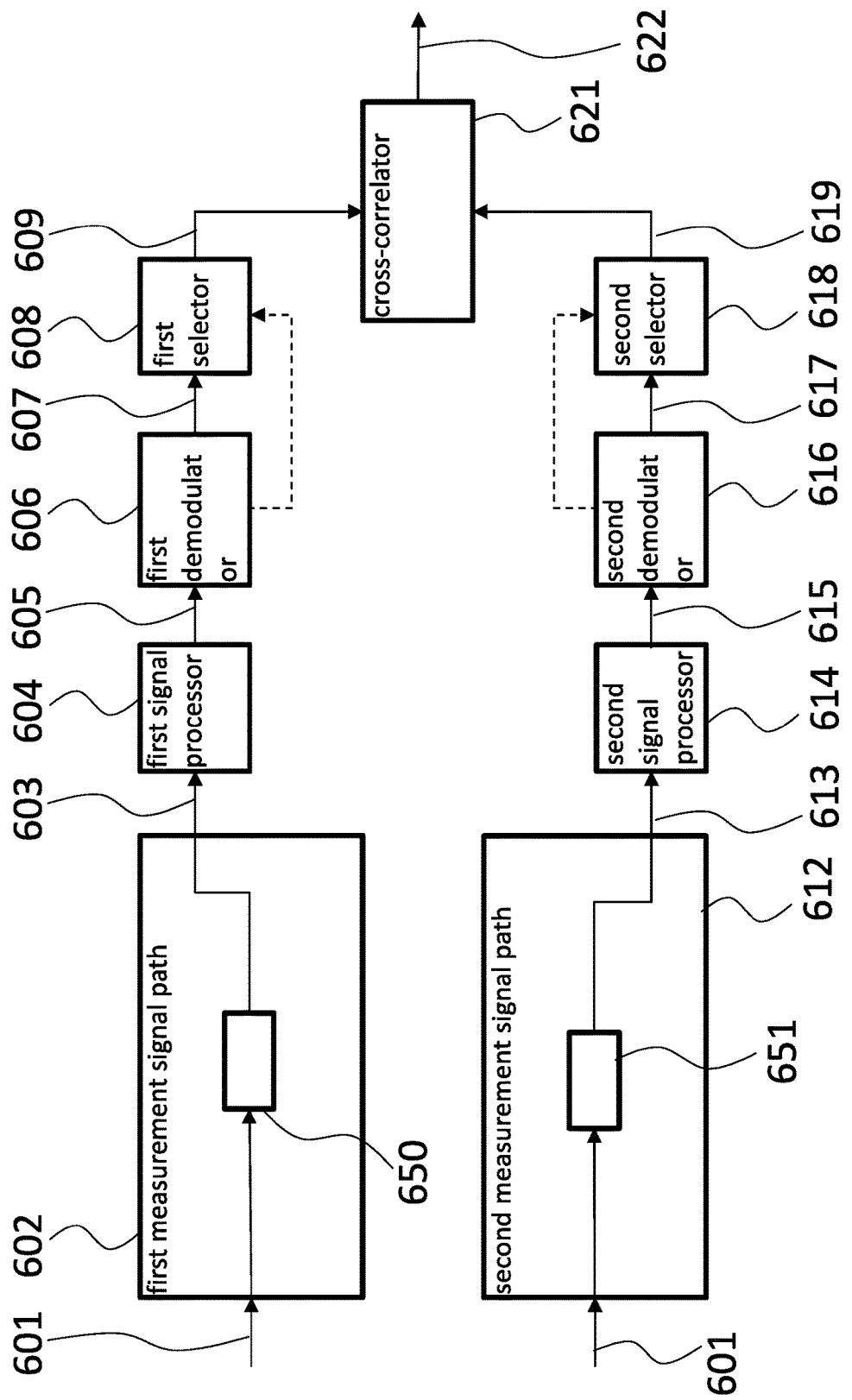
FIG. 6 shows a block diagram of another embodiment of a measurement application device according to the present disclosure.

FIG. 6 shows a block diagram of a measurement application device 600. The measurement application device 600 is based on the measurement application device 100. The measurement application device 600, therefore, comprises two signal paths with a first measurement signal path 602 that is coupled to a first signal processor 604 that is coupled to a first demodulator 606, that is coupled to a first selector 608, and with a second measurement signal path 612 that is coupled to a second signal processor 614 that is coupled to a second demodulator 616 that is coupled to a second selector 618. The first selector 608, and the second selector 618 are both coupled to a cross-correlator 621. The explanations provided herein for any other embodiment of the measurement application device also apply mutatis mutandis to the measurement application device 600.

In the measurement application device 600, the first measurement signal path 602 comprises an analog signal processing element 650, and the second measurement signal path 612 comprises an analog signal processing element 651.

The analog signal processing element 650, and the analog signal processing element 651 may exemplarily comprise a filter, an amplifier, or an attenuator, but are not limited to these types of elements.

Figure 7:
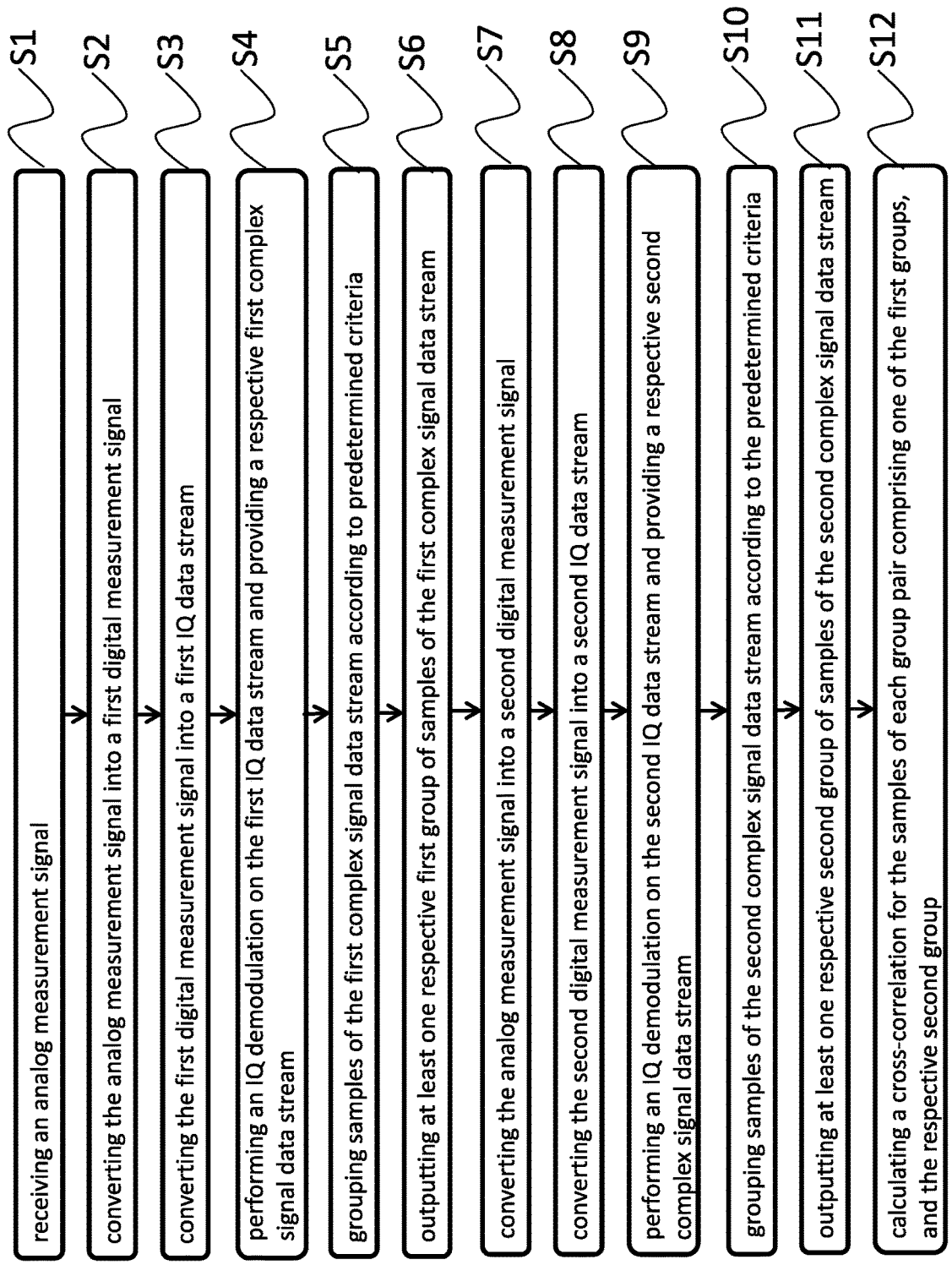
FIG. 7 shows a flow diagram of an embodiment of a method according to the present disclosure.

FIG. 7 shows a flow diagram of a signal processing method according to the present disclosure.

The method comprises receiving S1 an analog measurement signal, converting S2 the analog measurement signal into a first digital measurement signal, converting S3 the first digital measurement signal into a first IQ data stream, performing S4 an IQ demodulation on the first IQ data stream and providing a respective first complex signal data stream, grouping S5 samples of the first complex signal data stream according to predetermined criteria, outputting S6 at least one respective first group of samples of the first complex signal data stream, converting S7 the analog measurement signal into a second digital measurement signal, converting S8 the second digital measurement signal into a second IQ data stream, performing S9 an IQ demodulation on the second IQ data stream and providing a respective second complex signal data stream, grouping S10 samples of the second complex signal data stream according to the same predetermined criteria as the first selector, outputting S11 at least one respective second group of samples of the second complex signal data stream, and calculating S12 a cross-correlation for the samples of each group pair comprising one of the first groups, and the respective second group.

The reference signs of the single method steps do not imply any specific order. In embodiments, the method steps S2-S6, and S7-S11 may e.g., be performed in parallel.

In an embodiment, the analog measurement signal may be centrally received. The analog measurement signal may then be split, and provided for converting into a first digital measurement signal, and for converting into a second digital measurement signal.

Grouping samples of the first complex signal data stream may comprise selecting samples of the first complex signal data stream for a single first group and discarding samples that do not form part of the single first group. Grouping samples of the second complex signal data stream may comprise selecting samples of the second complex signal data stream for a single second group and discarding samples that do not form part of the single second group.

In embodiments, grouping samples of the first complex signal data stream may comprise selecting samples of the first complex signal data stream for at least two first groups. Grouping samples of the second complex signal data stream may comprise selecting samples of the second complex signal data stream for at least two second groups.

The selection criteria may refer to a property of the samples, like a signal power, a constellation point, and a time window. The samples may be grouped into the same first group if the value of the property of the samples is identical or within a predefined value range, and samples may be grouped into the same second group if the value of the property of the samples is identical or within a predefined value range.

The property for the samples of the first complex signal data stream, and the second complex signal data stream may be determined in the step of performing the IQ demodulation The result of the cross-correlation may be provided e.g., as an error vector magnitude over signal power, an error vector magnitude over constellation point, and an error vector magnitude over time windows.

In embodiments, the analog measurement signal may be mixed with an output signal of a first oscillator prior to converting the analog measurement signal into a first digital measurement signal. Further, the analog measurement signal may be mixed with an output signal of a second oscillator prior to converting the analog measurement signal into a second digital measurement signal. The first oscillator, and the second oscillator may output a signal with the same frequency and a common time base.

The method may further comprise at least one of filtering, amplifying, and attenuating the analog measurement signal at least one of prior to converting the analog measurement signal into the first digital measurement signal, and prior to converting the analog measurement signal into the second digital measurement signal.

Further digital signal processing functions, like resampling the first digital measurement signal, decimating the first digital measurement signal, resampling the second digital measurement signal, and decimating the second digital measurement signal may also be applied if adequate.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, case of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

LIST OF REFERENCE SIGNS 100, 200, 300, 400, 500, 600 measurement application device
101, 201, 301, 401, 501, 601 analog measurement signal
102, 202, 302, 402, 502, 602 first measurement signal path
103, 203, 303, 403, 503, 603 first digital measurement signal
104, 204, 304, 404, 504, 604 first signal processor
105, 205, 305, 405, 505, 605 first IQ data stream
106, 206, 306, 406, 506, 606 first demodulator
107, 207, 307, 407, 507, 607 first complex signal data stream
108, 208, 308, 408, 508, 608 first selector
109, 209, 309, 409, 509, 609 first group of samples
112, 212, 312, 412, 512, 612 second measurement signal path
113, 213, 313, 413, 513, 613 second digital measurement signal
114, 214, 314, 414, 514, 614 second signal processor
115, 215, 315, 415, 515, 615 second IQ data stream
116, 216, 316, 416, 516, 616 second demodulator
117, 217, 317, 417, 517, 617 second complex signal data stream
118, 218, 318, 418, 518, 618 second selector
119, 219, 319, 419, 519, 619 second group of samples
121, 221, 321, 421, 521, 621 cross-correlator
122, 222, 322, 422, 522, 622 cross-correlation
230 measurement port
231 splitter
232-1, 232-2 split analog measurement signal
545 first mixer
546 first oscillator
547 second mixer
548 second oscillator
650, 651 analog signal processing element
S1-S12 method steps

What is claimed is:

1. A measurement application device comprising: a first measurement signal circuitry path configured to receive an analog measurement signal, wherein the first measurement signal circuitry path is configured to convert the analog measurement signal into a first digital measurement signal;
a first signal processor coupled to the first measurement signal circuitry path, wherein the first signal processor is configured to convert the first digital measurement signal into a first IQ (in-phase and quadrature) data stream;
a first demodulator coupled to the first signal processor, wherein the first demodulator is configured to perform an IQ demodulation on the first IQ data stream, and provide a first complex signal data stream;

a first selector coupled to the first demodulator, wherein the first selector is configured to group samples of the first complex signal data stream according to predetermined criteria, and to output at least one respective first group of samples of the first complex signal data stream;

a second measurement signal circuitry path configured to receive the same analog measurement signal that is received by the first measurement signal circuitry path, wherein the second measurement signal circuitry path is configured to convert the analog measurement signal into a second digital measurement signal;

a second signal processor coupled to the second measurement signal circuitry path, wherein the second signal processor is configured to convert the second digital measurement signal into a second IQ data stream;

a second demodulator coupled to the second signal processor, wherein the second demodulator is configured to perform an IQ demodulation on the second IQ data stream, and provide a second complex signal data stream;

a second selector coupled to the second demodulator, wherein the second selector is configured to group samples of the second complex signal data stream according to the same predetermined criteria as the first selector, and to output at least one respective second group of samples of the second complex signal data stream; and a cross-correlator coupled to the first selector, and the second selector, wherein the cross-correlator is configured to calculate a cross-correlation for the samples of each group pair comprising one of the respective first group, and the respective second group.

2. The measurement application device according to claim 1, further comprising a measurement port, and a signal splitter, wherein the signal splitter is coupled to the measurement port, the first measurement signal circuitry path, and the second measurement signal circuitry path, and
wherein the signal splitter is configured to receive the analog measurement signal from the measurement port, and split the analog measurement signal, and provide the split analog measurement signal to the first measurement signal circuitry path, and the second measurement signal circuitry path.

3. The measurement application device according to claim 1, wherein the predetermined selection criteria refer to a property of samples,
wherein the first selector groups samples into the same first group when a value of the property of the samples is identical or within a predefined value range, and
wherein the second selector groups samples into the same second group when the value of the property of the samples is identical or within the predefined value range.

4. The measurement application device according to claim 3, wherein the property for the samples of the first complex signal data stream is provided by the first demodulator, and
wherein the property for the samples of the second complex signal data stream is provided by the second demodulator.

5. The measurement application device according to claim 3, wherein the property of the samples comprises at least one of:
a signal power;
a constellation point; and
a time window.

6. The measurement application device according to claim 5, wherein a result of the cross-correlation comprises at least one of:
an error vector magnitude over the signal power;
an error vector magnitude over the constellation point;
an error vector magnitude over the time window;
power measurements over the constellation point; and
power measurements over the time window.

7. The measurement application device according to claim 1, wherein the first selector is configured to select samples of the first complex signal data stream for a single first group and discard samples that do not form part of the single first group, and
wherein the second selector is configured to select samples of the second complex signal data stream for a single second group and discard samples that do not form part of the single second group.

8. The measurement application device according to claim 1, wherein the first selector is configured to select samples of the first complex signal data stream for at least two first groups, and
wherein the second selector is configured to select samples of the second complex signal data stream for at least two second groups.

9. The measurement application device according to claim 1, wherein the first measurement signal circuitry path comprises a first mixer and a first oscillator for mixing the analog measurement signal with a first output signal of the first oscillator,
wherein the second measurement signal circuitry path comprises a second mixer and a second oscillator for mixing the analog measurement signal with a second output signal of the second oscillator, and
wherein the first output signal, and the second output signal have the same frequency.

10. The measurement application device according to claim 1, wherein at least one of the first measurement signal circuitry path, and the second measurement signal circuitry path comprises at least one of:
a filter;
an amplifier; and
an attenuator.

11. The measurement application device according to claim 1, wherein at least one of: the first signal processor is configured to at least one of resample the first digital measurement signal, and decimate the first digital measurement signal; and
the second signal processor is configured to at least one of resample the second digital measurement signal, and decimate the second digital measurement signal.

12. A signal processing method, the method comprising:
receiving an analog measurement signal;
converting the analog measurement signal into a first digital measurement signal;
converting the first digital measurement signal into a first IQ (in-phase and quadrature) data stream;
performing an IQ demodulation on the first IQ data stream, and providing a respective first complex signal data stream;
grouping samples of the first complex signal data stream according to predetermined criteria;
outputting at least one respective first group of samples of the first complex signal data stream;
converting the analog measurement signal into a second digital measurement signal;

converting the second digital measurement signal into a second IQ data stream;

performing an IQ demodulation on the second IQ data stream, and providing a respective second complex signal data stream;

grouping samples of the second complex signal data stream according to the same predetermined criteria;

outputting at least one respective second group of samples of the second complex signal data stream; and calculating a cross-correlation for the samples of each group pair comprising one of the respective first group, and the respective second group.

13. The method according to claim 12, further comprising centrally receiving the analog measurement signal;

splitting the analog measurement signal; and providing the split analog measurement signal for converting into the first digital measurement signal, and for converting into the second digital measurement signal.

14. The method according to claim 12, wherein the selection criteria refer to a property of samples, wherein samples are grouped into the same first group when a value of the property of the samples is identical or within a predefined value range, and wherein samples are grouped into the same second group when the value of the property of the samples is identical or within the predefined value range.

15. The method according to claim 14, wherein the property for the samples of the first complex signal data stream is determined in the step of performing the IQ demodulation, and wherein the property for the samples of the second complex signal data stream is determined in the step of performing the IQ demodulation.

16. The method according to claim 14, wherein the property of the samples comprises at least one of:

a signal power;

a constellation point; and a time window.

17. The method according to claim 16, wherein a result of the cross-correlation comprises at least one of:

an error vector magnitude over the signal power;

an error vector magnitude over the constellation point; and an error vector magnitude over the time window.

18. The method according to claim 12, wherein the grouping samples of the first complex signal data stream comprises selecting samples of the first complex signal data stream for a single first group and discarding samples that do not form part of the single first group, and wherein the grouping samples of the second complex signal data stream comprises selecting samples of the second complex signal data stream for a single second group and discarding samples that do not form part of the single second group.

19. The method according to claim 12, wherein the grouping samples of the first complex signal data stream comprises selecting samples of the first complex signal data stream for at least two first groups, and wherein the grouping samples of the second complex signal data stream comprises selecting samples of the second complex signal data stream for at least two second groups.

20. The method according to claim 12, wherein the analog measurement signal is mixed with a first output signal of a first oscillator prior to converting the analog measurement signal into the first digital measurement signal, wherein the analog measurement signal is mixed with a second output signal of a second oscillator prior to converting the analog measurement signal into the second digital measurement signal, and wherein the first output signal, and the second output signal have the same frequency.

21. The method according to claim 12, further comprising at least one of:

filtering;

amplifying; and attenuating the analog measurement signal at least one of prior to converting the analog measurement signal into the first digital measurement signal, or prior to converting the analog measurement signal into the second digital measurement signal.

22. The method according to claim 12, further comprising at least one of:

resampling the first digital measurement signal;

decimating the first digital measurement signal;

resampling the second digital measurement signal; and decimating the second digital measurement signal.

* * * * *